United States Patent [19]

Luckey et al.

[11] Patent Number: 4,710,637
[45] Date of Patent: Dec. 1, 1987

[54] HIGH EFFICIENCY FLUORESCENT SCREEN PAIR FOR USE IN LOW ENERGY X RADIATION IMAGING

[75] Inventors: George W. Luckey; Bernard Roth; Kathleen E. Brendel; Margaret S. Den Dunne, all of Rochester, N.Y.

[73] Assignee: Eastman Kodak Company, Rochester, N.Y.

[21] Appl. No.: 944,893

[22] Filed: Dec. 22, 1986

Related U.S. Application Data

[63] Continuation-in-part of Ser. No. 827,683, Feb. 10, 1986, abandoned.

[51] Int. Cl.⁴ ............................................. G01J 1/58
[52] U.S. Cl. .................................. 250/486.1; 378/37
[58] Field of Search ..................... 250/486.1; 378/37

[56] References Cited

U.S. PATENT DOCUMENTS

| | | | |
|---|---|---|---|
| 2,088,595 | 8/1937 | Hartmann | 250/475.2 |
| 2,146,573 | 2/1939 | Hartmann | 250/487.1 |
| 4,039,840 | 8/1977 | Shimiya et al. | 250/486.1 |
| 4,101,781 | 7/1978 | Neukermans et al. | 250/486.1 |
| 4,425,425 | 1/1978 | Abbott et al. | 430/502 |
| 4,425,426 | 1/1978 | Abbott et al. | 430/502 |
| 4,513,078 | 4/1985 | Sandrick et al. | 250/486.1 |

OTHER PUBLICATIONS

Haus, "Physical Principles and Radiation Dose in Mammography", *Medical Radiography and Photography*, vol. 58, No. 3, pp. 70–83, 1982, published by Eastman Kodak Company, Rochester, New York, 14650.
J. H. Hartmann, *Fortschr. auf dem Gebiete der Rontgenstrahlen*, 43, 6, 758–766 (1931).
J. H. Hartmann, Verhandlungen der Deutschen Rontgen Gesellschaft 24, 56–61 (1932).
W. Barth, J. Eggert, and K. V. Hollenben, *Veroff. des Wissenschaft. Zentral Laboratorium Agfa*, 2, 118–133 (1931).
R. Blank and U. Goering, *Phot. Korr.* 102, 118–126 (1966).
A. Pfahl, *Rontgen Blatter* 10, 52–57, 107–117, 135–146 (1957).
Nishikawa and Yaffe, "Signal-to-Noise Properties of Mammographic Film-Screen Systems", *Med. Phys.* 12(1), Jan./Feb. 1985.

*Primary Examiner*—Janice A. Howell
*Assistant Examiner*—William F. Rauchholz
*Attorney, Agent, or Firm*—Carl O. Thomas

[57] ABSTRACT

A pair of front and back intensifying screens is disclosed capable of providing a sharp imagewise exposure of a dual coated silver halide radiographic element to light when the screens are imagewise exposed to X radiation predominantly of an energy level below 40 keV. The front intensifying screen is comprised of a fluorescent layer having modulation transfer factors greater than those of reference curve A in FIG. 3 and capable of attenuating by 20 to 60 percent a reference X radiation exposure produced by a Mo target tube operated at 28 kVp with a three phase power supply, wherein the reference X radiation exposure passes through 0.03 mm of Mo and 4.5 cm of poly(methyl methacrylate) to reach the fluorescent layer mounted 25 cm from a Mo anode of the target tube and attenuation is measured 50 cm beyond the fluorescent layer. The back intensifying screen has modulation transfer factors greater than those of reference curve B in FIG. 3 and is capable of attenuating by at least 60 percent X radiation received from the front screen when the reference exposure is repeated with both the front and back screens present.

7 Claims, 3 Drawing Figures

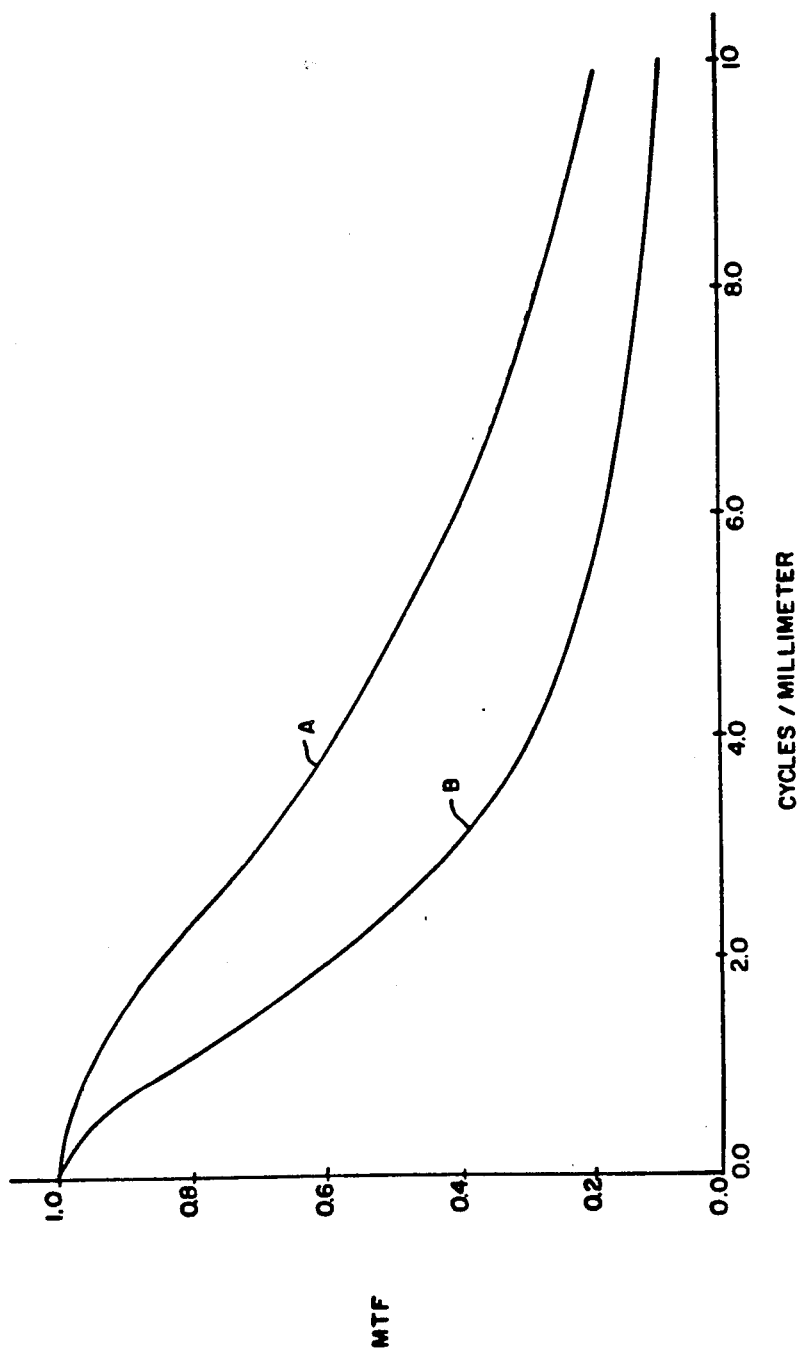

HIGH EFFICIENCY FLUORESCENT SCREEN PAIR FOR USE IN LOW ENERGY X RADIATION IMAGING

This is a continuation-in-part of copending, commonly assigned, U.S. Ser. No. 827,683, filed Feb. 10, 1986, now abandoned.

FIELD OF THE INVENTION

This invention is directed to a fluorescent screen pair for exposing dual coated silver halide radiographic elements to light in response to low energy X radiation exposure.

BACKGROUND OF THE INVENTION

Photographic elements relying on silver halide emulsions for image recording have been recognized to possess outstanding sensitivity to light for more than a century. Roentgen discovered X radiation by the inadvertent exposure of a silver halide photographic element. In 1913 the Eastman Kodak Company introduced its first product specifically intended to be exposed by X radiation.

The desirability of limiting patient exposure to high levels of X radiation has been recognized from the inception of medical radiography. In 1918 the Eastman Kodak Company introduced the first medical radiographic product which was dual coated—that is, coated with silver halide emulsion layers on the front and back of the support.

At the same time it was recognized that silver halide emulsions are more responsive to light than to X rays. The Patterson Screen Company in 1918 introduced matched intensifying screens for Kodak's first dual coated (Duplitized ®) radiographic element. An intensifying screen contains a phosphor which absorbs X radiation and emits radiation of a longer wavelength, usually in the near ultraviolet, blue, or green portion of the spectrum.

While the necessity of limiting patient exposure to high levels of X radiation was quickly appreciated, the questioning of patient exposure to even low levels of X radiation has emerged gradually. Although dual coated radiographic elements in combination with intensifying screen pairs have been extensively employed for the less penetrable portions of the body, up until the 1970's direct X ray exposures of radiographic elements without resort to intensifying screens was used for examinations of patient extremities and soft tissue.

Mammography can be used to illustrate the separate development of soft tissue radiography. Mammography employs low energy X radiation—that is, X radiation which is predominantly of an energy level less than 40 keV. Mammographic investigations with silver halide radiographic elements were conducted with direct X ray exposures until the first intensifying screen-silver halide film combination for mammography was introduced in the early 1970's.

Neither dual coated films nor intensifying screen pairs have been used for low energy X radiation mammographic investigations. The reason for this resides in a number of interrelated constraints that are unique to low energy radiography. Perhaps most apparent is that low energy X radiation is limited in its ability to penetrate the phosphors forming intensifying screens. If a conventional thoracic examination intensifying screen pair were used for mammography, only the front screen (the screen nearest the X ray source) would receive any appreciable amount of low energy radiation. Further, being of lower energy, the X rays would be absorbed farther from the silver halide emulsion layer than in thoracic examination, resulting in a less sharp image, whereas mammography requires exceedingly sharp imaging for identifying small and subtle aberrations in tissue.

Nishikawa and Yaffe, "Signal-to-Noise Properties of Mammographic Film-Screen Systems", *Med. Phys.* 12(1), Jan./Feb. 1985, discloses investigations with a faster film-screen system used in mammography, the 3M XUD/Trimax-2 system: two screens used with a double emulsion anticrossover film. In comparing this symmetrical screen pair and double emulsion film with a rival commercial single screen and single emulsion film combination, Ortho M/Min-R, the symmetrical screen pair was reported to be twice as fast with roughly similar image noise characteristics at low frequencies. No comparison of sharpness was reported.

Haus, "Physical Principles and Radiation Dose in Mammography", *Medical Radiography and Photography*, Vol. 58, No. 3, pp. 70–83, 1982, published by Eastman Kodak Company, Rochester, N.Y. 14650, provides a review of medical mammography and its development.

Additional items illustrating the state of the art are listed and described in APPENDIX I.

SUMMARY OF THE INVENTION

In one aspect this invention is directed to a pair of front and back intensifying screens capable of providing a sharp imagewise exposure of a dual coated silver halide radiographic element to light when imagewise exposed to X radiation predominantly of an energy level below 40 keV consisting of a front intensifying screen comprised of a fluorescent layer having modulation transfer factors greater than those of reference curve A in FIG. 3 and capable of attenuating by 60 to 25 percent a reference X radiation exposure produced by a Mo target tube operated at 28 kVp with a three phase power supply, wherein the reference X radiation exposure passes through 0.03 mm of Mo and 4.5 cm of poly(methyl methacrylate) to reach said fluorescent layer mounted 25 cm from a Mo anode of the target tube and attenuation is measured 50 cm beyond the fluorescent layer, and a back intensifying screen having modulation transfer factors greater than that of reference curve B in FIG. 3 and capable of attenuating by at least 60 percent X radiation received from the front screen when the reference exposure is repeated with both the front and back screens present.

Contrary to the general consensus of the art as represented by commercial product offerings and published teachings prior to this invention, it has been discovered that in low energy radiography an assembly of a dual coated silver halide radiographic element and a properly chosen asymmetrical pair of intensifying screens can exhibit superior radiographic performance in terms of exposure levels, image sharpness, and image uniformity (image noise) than can be achieved with an assembly of a comparable dual coated radiographic element and a symmetrical pair of intensifying screens.

Specifically, it has been observed that, contrary to prior practice, a pair of front and back intensifying screens can be used in low energy radiography for more efficient imaging, provided a proper selection and balance of the properties of each screen is made. The result is that radiographic images which are superior to those presently deemed acceptable in the art can be realized with reduced exposure levels. As demonstrated in the examples, screen pairs according to this invention are capable of producing sharp images exhibiting low noise levels. They are capable of more than halving the amount of X radiation required for imaging using a single screen. The higher speed of the screen pairs can be used to reduce subject motion, reduce geometrical sources of unsharpness, and allow techniques for improving imaging which would otherwise require increased patient X ray exposure.

Prior to the present invention it has been assumed by those skilled in the art that improvements in low energy radiographic imaging can be realized only by the synthesis of new and more efficient materials, principally phosphors. The present invention demonstrates that the manner in which known high efficiency phosphors are applied to low energy radiography permits substantial improvements in imaging and reductions in exposure levels to be realized.

SUMMARY OF THE DRAWINGS

FIG. 3 is a plot of modulation transfer factors (MTF) versus cycles per millimeter, showing minimum acceptable MTF levels for the front and back intensifying screens.

DESCRIPTION OF PREFERRED EMBODIMENTS

Figure 1:
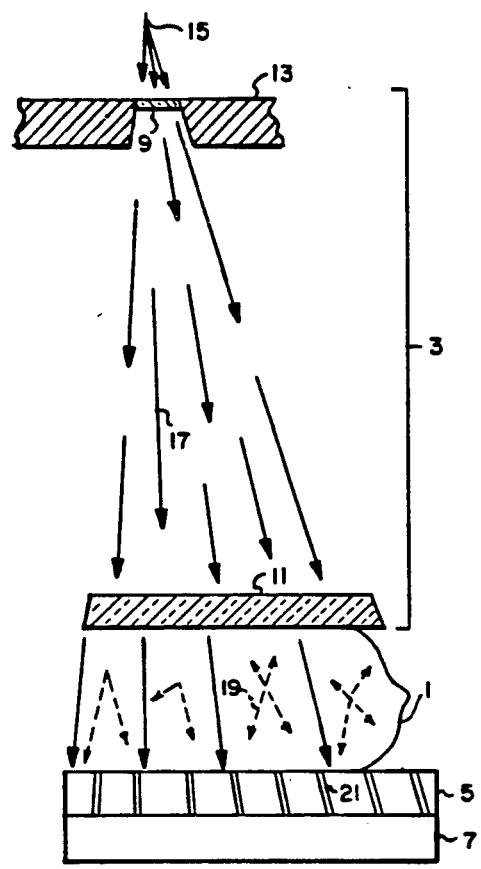
FIG. 1 is a schematic diagram of an imaging arrangement.

A simple arrangement for examining soft tissue with low energy X radiation is illustrated in FIG. 1. Soft tissue 1 to be examined radiographically, in this instance a breast, is located between an exposure and compression arrangement 3 and an exposure grid 5. Beneath the grid is located an exposure recording assembly 7.

The exposure and compression arrangement is comprised of a radiation input window 9 and an output window 11, which are each substantially transparent to X radiation. The output window acts also as a compression element so that the breast is held well compressed during examination. A wall 13 formed of a material having low penetrability to X radiation joins the input window and defines with it an X radiation field emanating from a tube or other conventional source, shown schematically as emanating from focal spot 15.

Unscattered X radiation passing through the input and output windows and soft tissue to the grid is indicated by the solid arrows 17. Collisions of X radiation with matter within the soft tissue results in part in absorption of the X radiation and in part in redirecting the X radiation. Redirected—i.e., scattered X radiation—is illustrated schematically by dashed arrows 19.

The grid is equipped with vanes 21, which are relatively impenetrable by the X radiation and arranged parallel to the unscattered X radiation. The vanes permit almost all of the unscattered X radiation to pass through the grid uninterrupted. X radiation that has been slightly redirected is capable of passing through the grid also, but the most highly scattered X radiation, which, if left alone, would produce the greatest degradation in image sharpness, is intercepted and deflected by the vanes. The thickness and spacing of the vanes is exaggerated in FIG. 1 for ease of illustration. By vane construction and spacing the desired balance between the attenuation of X radiation supplied to the exposure recording assembly and the sharpness of the image can be realized. To minimize X ray attenuation the grid can be entirely eliminated, but a grid is usually preferred to improve sharpness. Suitable exposure grids are known and commercially available.

Figure 2:
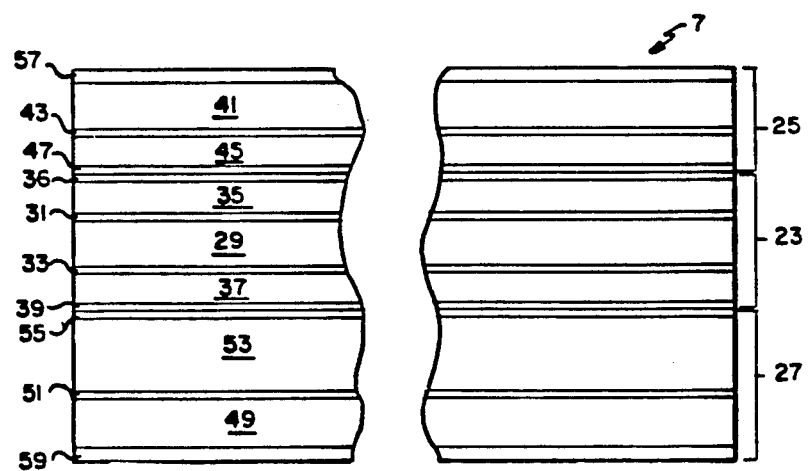
FIG. 2 is a schematic diagram of radiographic element and screen pair assembly.

In FIG. 2 the exposure recording assembly 7 is shown in greater detail. A conventional case or cassette used to compress the elements of the assembly into close contact is not shown. The assembly consists of three separate elements, a dual coated silver halide radiographic element 23, a front screen 25 intended to be positioned between the radiographic element and an exposing X radiation source, and a back screen 27. The two screens together form a front and back intensifying screen pair.

As shown, the dual coated radiographic element consists of a support 29 having subbing layers 31 and 33 coated on its opposite major faces. Silver halide emulsion layers 35 and 37 overlie the subbing layers 31 and 33, respectively. Overcoat layers 36 and 39 overlie the emulsion layers 35 and 37, respectively.

As shown, the front screen is comprised of a support 41, a subbing layer 43, a fluorescent phosphor layer 45, and an overcoat layer 47. Similarly, the back screen as shown is comprised of a support 49, a subbing layer 51, a fluorescent phosphor layer 53, and an overcoat layer 55. Anticurl layers 57 and 59 are coated on the major faces of the supports 41 and 49 of the front and back screens, respectively, opposite the phosphor layers.

In use, X radiation enters the image recording assembly through the front screen anticurl layer 57 and support 41 passing uninterrupted to phosphor layer 45. A portion of the X radiation is absorbed in the front screen phosphor layer. The remaining X radiation passes through the overcoat layers 47 and 36. A small portion of the X radiation is absorbed in the silver halide emulsion layer 35, thereby contributing directly to the formation of a latent image in the emulsion layer. However, the major portion of the X radiation received by the emulsion layer 35 passes through the support 29 and associated subbing layers 31 and 33 to the remaining silver halide emulsion layer 37. Again a small portion of the X radiation is absorbed in the remaining silver halide emulsion layer, thereby contributing directly to the formation of a latent image in this emulsion layer. Again, however, the major portion of the X radiation received by the emulsion layer 37 passes through the overcoat layers 39 and 55 to the phosphor layer 53 of the back screen. The major portion of the X radiation striking the back screen phosphor layer is absorbed in this layer.

Exposing X radiation is principally absorbed in the phosphor layers 45 and 53, thereby producing a longer wavelength emission, typically an ultraviolet, blue, or green light emission. Visible or ultraviolet light emitted by the front screen phosphor layer 45 exposes the adjacent silver halide emulsion layer 35. Light emitted by the back screen phosphor layer 53 exposes the adjacent silver halide emulsion layer 37. These light exposures primarily account for the latent image formed in the silver halide emulsion layers.

From the foregoing, it is apparent that all of the layers above the phosphor layer 53 must be penetrable by X radiation to at least some extent. While the silver halide emulsion layers usefully absorb some X radiation, the only other usefully absorbed X radiation occurs in the front screen phosphor layer. Thus the supports and overcoat and subbing layers overlying the back screen phosphor layer are chosen to be as nearly transparent to exposing X radiation as possible.

It is also apparent that the overcoat layers 36 and 47 separating the front screen phosphor layer and the emulsion layer adjacent thereto as well as the overcoat layers 39 and 55 separating the back screen phosphor layer and the emulsion layer adjacent thereto are preferably transparent to light. Being transparent to both X radiation and light, the overcoat layers 36, 47, 39, and 55, though preferred for other reasons, are not needed for imaging and can be omitted.

Light is emitted by the front screen phosphor layer 45 toward both the adjacent emulsion layer 35 and the subbing layer 43, the support 41, and the anticurl layer 57. If the subbing layer, the support, or the anticurl layer is reflective, the light will be directed back to the emulsion layer 35. This can have the effect of increasing the speed of the image recording assembly, but the speed increase is achieved at the expense of sharpness. Therefore, it is preferred that the subbing layer, support, and anticurl layer are each transparent to or capable of absorbing emitted light, but exhibit minimal reflectivity. To avoid light leaving the assembly when the subbing layer, support, and anticurl layer are each transparent from being reflected back, thereby impairing image sharpness, the assembly is in such instance preferably mounted between black film, paper, or foam layers. Again, since the anticurl layer 57, support 41, and subbing layer 43 need absorb neither X radiation nor light, it is apparent that they are not essential to the performance of the assembly. Thus, though convenient to include for other reasons, they can be omitted. In the absence of its support 41 the phosphor layer 45 can alternatively be removably coated directly over the emulsion layer 35.

The back screen phosphor layer 53 is shown in FIG. 2 to be relatively thicker than the front screen phosphor layer 45. Since the back screen is the intended end destination of all X radiation not previously absorbed, it can absorb substantially all incident X radiation. It is thus apparent that the subbing layer 51, support 49, and anticurl layer 59, though preferably included for other reasons, are not essential to imaging and can be omitted. In the absence of its support 49 the phosphor layer 53 can alternatively be removably coated directly over the emulsion layer 37.

From the foregoing, it is apparent that the image recording assembly need not be three separate elements as shown in FIG. 2, but can be two elements with either the front phosphor layer 45 or the back phosphor layer 53 integrated with the radiographic element. Alternatively both phosphor layers can be integrated with the radiographic element to form a single element assembly.

If, instead of using a dual coated radiographic element 23 as shown in FIG. 2, two separate radiographic elements are employed each coated with an emulsion layer on one major support surface, the three element assembly 7 is replaced by a four element assembly. For example, such a four element assembly results in FIG. 2 merely by replacing radiographic element support 29 with two separate supports mounted in back to back contact. If the front and back phosphor layers are each integrated with the adjacent radiographic element, the result is a two element assembly, each containing a phosphor layer and a silver halide emulsion layer. In still another variation it is apparent that an extremely sharp image can be produced by replacing the dual coated radiographic element 23 with a single silver halide emulsion layer integrated with one of the front and back screens.

From these various combinations it is apparent that only the two phosphor layers, one intervening silver halide emulsion layer, and some means, such as a support, for giving structural integrity to the layers are essential to image recording. The resolution of the image recording assembly into three separate elements, a front and back screen pair each containing a phosphor layer and an intervening radiographic element having at least one silver halide emulsion layer results from the normal practice of reusing the phosphor layers for many exposures while the silver halide emulsion layer is rarely used for more than a single exposure. While only one silver halide emulsion layer is essential to imaging, higher levels of sharpness and lower image noise levels are achieved with two emulsion layers, one adjacent each screen.

It has been discovered that in low energy radiography such an assembly can exhibit superior performance in terms of image sharpness and required levels of exposure. The present invention is based on the discovery that a front and back pair of screens, properly chosen and balanced in their properties can produce imaging characteristics superior to those achieved using a single screen or a pair of identical screens in accordance with the accepted practice of the art prior to this invention.

Low energy X radiation is herein defined as X radiation more than 50 percent of the photons of which are at an energy level of less than 40 keV. In practice the molybdenum and tungsten target X ray tubes used for generating X radiation for examination of soft tissue are operated at voltages which produce only very minor amounts of X ray photons of an energy level greater than 40 keV. In a typical mammographic application Haus, cited above, shows both molybdenum and tungsten target X ray tubes which produce photons of energy levels entirely below 30 keV when operated at 28 and 24 kVp, respectively.

The choice of the phosphor layer for the front screen is most critical to producing a superior quality image. If the front screen is too thick, it will absorb an unduly high proportion of X radiation, thereby usurping the X radiation absorbing function of the back screen. Further, sharpness is degraded in direct relation to the increase of the front screen thickness. On the other hand, it is known that when phosphor layers become too thin, coating nonuniformities, such as nonuniformity in thickness, drying patterns, and the like detract from the overall quality of the image. This is reflected in high levels of image mottle (image noise) in the imagewise exposed film.

It has been discovered that superior images are produced when the front screen is capable of attenuating by 20 (preferably 35 and optimally 40) to 60 (preferably 55, most preferably 50, and optimally 45) percent, a reference X radiation exposure produced by a Mo target tube operated at 28 kVp with a three phase power supply, wherein the reference X radiation exposure passes through 0.03 mm of Mo and 4.5 cm of poly(methyl methacrylate) to reach the phosphor layer of the front screen mounted 25 cm from a Mo anode of the target tube and attenuation is measured 50 cm beyond the phosphor layer. This allows the remaining X radiation to be transmitted to the underlying elements of the assembly thereby allowing adequate X radiation transmission to the back screen.

At the same time, to obtain superior image sharpness, the modulation transfer factors of the front screen are maintained equal to or greater than the modulation transfer factors of Curve A in FIG. 3. Preferred front screens are those having MTF's at least 1.1 times those of reference curve A over the range of from 5 to 10 cycles per mm. Modulation transfer factor (MTF) measurement for screen-film radiographic systems is described by Kunio Doi et al, "MTF and Wiener Spectra of Radiographic Screen-Film Systems", U.S. Department of Health and Human Services, pamphlet FDA 82-8187. The profile of the individual modulation transfer factors over a range of cycles per mm constitutes a modulation transfer function.

To maintain required MTF levels the effective thickness of the phosphor layer is characteristically maintained at less than 60 $\mu$m, preferably less than 45 $\mu$m, most preferably less than 40 $\mu$m, and optimally less than 35 $\mu$m. When the phosphor layer consists essentially of only the phosphor and its binder and is coated on a support having a total reflectance of less than 20 percent, the actual thickness of the phosphor layer and the effective thickness of the phosphor layer are one and the same.

It is known in the art that the sharpness of a thicker phosphor layer can be tailored to match that of a thinner phosphor layer by adding a substance, such as a dye or pigment, capable of absorbing a portion of the light emitted by the phosphor layer. Light traveling in the phosphor layer, to the extent it departs from a direction normal to the phosphor layer major faces, experiences an increased path length in the phosphor layer that increases its probability of absorption. This renders the light which would contribute disproportionately to sharpness degradation more likely to be absorbed in the phosphor layer, provided a light absorbing material is present. Even very small amounts of absorbing material, less than 1 percent, preferably less than 0.006 percent, based on the weight of the phosphor, are highly effective in improving sharpness. If desired, sharpness qualities can be tailored to specific uses by employing a combination of light absorbing materials (e.g., carbon) and light scattering materials (e.g., titania).

It is then the effective thickness rather than the actual thickness of the phosphor layer which is essential to its suitability for producing a sharp image. The effective thickness of a phosphor layer is herein defined as that which exhibits modulation transfer factors equal to those of an otherwise corresponding phosphor layer consisting essentially of the phosphor and its binder in the same proportions coated on a support having a total reflectance of less than 20 percent.

While simply adding an absorbing material to the front screen phosphor layer can reduce its effective thickness, it must be pointed out that addition of absorbing material does not reduce the proportion of X radiation absorbed by the phosphor layer. It is possible to use a thick front screen phosphor layer and reduce its effective thickness markedly by using an increased amount of a material capable of absorbing emitted light, but the increased thickness, though not reflected in effective thickness, results in absorbing more of the X radiation in the front screen and transmitting a lower proportion of light to the radiographic element. In general any convenient proportion of absorber can be incorporated in the front screen phosphor layer which is consistent with the required effective layer thickness and proportion of X radiation absorbed by the front screen. To optimize speed it is preferred that less than about 0.1, most preferably less than 0.01, percent of absorber, based on the weight of phosphor, be incorporated in the front screen.

Although the front screen support as well as its subbing and anticurl layers are all preferably transparent to light and preferably used with a black plastic film, paper, or foam backing, as previously indicated, it is recognized that the speed of the front screen is increased if elevated reflection from the front screen support or one of the subbing or anticurl layers is achieved. To offset reduction in sharpness attributable to the reflected light an absorbing material can be incorporated in the phosphor layer. Thus, the absorbing material can be employed to decrease transmission of scattered light in the phosphor layer, thereby enhancing sharpness independent of the origin of light scattering.

The effective thickness of the front screen phosphor layer is low in comparison to the screen phosphor layer thicknesses heretofore actually employed in the art. The reason for this is that the art has predicated minimum effective thicknesses of phosphor layers on the use of a single screen or a symmetrical pair of screens, thinking that only a single screen or a symmetrical screen pair can be effectively employed for low energy radiography. The front screen phosphor layer effective thicknesses herein contemplated are those which have been regarded as too low to hold coating (and therefore imaging) nonuniformities to acceptably low levels.

It has been observed that by employing an asymmetrical front and back screen pair in low energy silver halide radiography, low effective thicknesses for the front screen, highly desirable for improved sharpness, are consistent also with satisfying art requirements for minimizing image mottle (image noise). It is now appreciated that lower front screen phosphor layer thicknesses are possible without excessive imaging nonuniformities by employing a thicker back screen in combination. Image mottle produced by thin screens can be attributed to the reduction of phosphor coating coverages emphasizing thickness nonuniformities of the coating layer in terms of point to point variations in light emission.

The present invention is based in part on the observation that the back screen phosphor layer can offset the point to point variations in phosphor emissions in the front screen. If the front screen phosphor layer at a selected reference point exhibits a less than average thickness and thus emits a less than average amount of light, it is also absorbing less than an expected amount of X radiation incident at the selected point. Using two screens the unabsorbed X radiation continues its travel and strikes the second screen phosphor layer. The X radiation striking the second phosphor layer beneath the selected point is a greater proportion of the total X radiation incident upon the assembly by the same amount that the X radiation absorbed at the selected point in the front screen is less than that which should have been absorbed, based on an absolutely uniform front screen phosphor layer coating. The higher level of incident X radiation at the selected point in the back screen is directly translated into a higher than expected light emission. Looking at the images produced in a dual coated radiographic element separating the front and back screens, the emulsion layer nearest the front screen produces an image density at the selected reference point somewhat below that which should have been produced while the image density at the selected reference point produced in the emulsion layer adjacent the back screen is somewhat higher than that which should have been produced, assuming absolute uniformity of the phosphor layers. The result is that the density nonuniformities in the two emulsion layers complement each other, so that the mottle attributable to coating nonuniformities which would have been observed using the front screen alone is markedly reduced in magnitude. While the foregoing description refers to a selected point at which the front screen is of less than average thickness, the same front and back screen compensation occurs at a selected point at which the front screen is of greater than average thickness.

The back screen performance requirements differ from those of the front screen in that all (100%) of the X radiation received by the back screen can be absorbed without any imaging penalty, provided sharpness criteria are satisfied. Sharpness requirements are satisfied when the back screen exhibits modulation transfer factors equal to or greater than those of reference curve B in FIG. 3. Preferred back screens are those having MTF's at least 1.1 times those of reference curve B over the range of from 1 to 10 cycles per mm and optimally MTF's at least twice those of curve B over the range of from 5 to 10 cycles per mm.

In practice, it is generally preferred to construct the back screen phosphor layer so that it is thicker than the front screen phosphor layer, thereby favoring higher levels of X radiation absorption. The back screen can, for example, take the form of a conventional intensifying screen used alone in low energy radiography.

Preferred back screen phosphor layers are those which have an effective thickness greater than that of the phosphor layer of the front screen with which they are paired. Optimum back screen phosphor layers for the most efficient combination of speed and sharpness in imaging are those having an effective thickness in the range of from about 60 to 100 $\mu$m. As compared to the front screen, it is somewhat more advantageous to use a thicker phosphor layer to construct the back screen and to favor the use of a light absorber to control effective thickness and thus the MTF. Since the balance of speed and sharpness is more weighted toward speed for the back screen as compared to the front screen, the use of a reflective material in the phosphor layer, a reflective support and/or a reflective subbing layer is within the contemplation of the invention, although this is not required. For example, the back screen can include a titania layer coated between the phosphor layer and the support.

When the effective thickness, MTF, and percentage of reference exposure X radiation attenuation requirements are considered together for the front intensifying screen, the preferred phosphors include calcium tungstate ($CaWO_4$); niobium and/or rare earth activated yttrium, lutetium, and gadolinium tantalates; and rare earth activated rare earth oxychalcogenides and halides. As herein employed rare earths are elements having an atomic number of 39 or 57 through 71. The rare earth oxychalcogenide and halide phosphors are preferably chosen from among those of the formula:

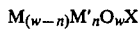

$$M_{(w-n)}M'_nO_wX$$

wherein:
M is at least one of the metals yttrium, lanthanum, gadolinium, or lutetium, M' is at least one of the rare earth metals, preferably dysprosium, erbium, europium, holmium, neodymium, praseodymium, samarium, terbium, thulium, or ytterbium, X is a middle chalcogen (S, Se, or Te) or halogen, n is 0.0002 to 0.2, and w is 1 when X is halogen or 2 when X is chalcogen.

Calcium tungstate phosphors are illustrated by Wynd et al U.S. Pat. No. 2,303,942. Niobium-activated and rare earth-activated yttrium, lutetium, and gadolinium tantalates are illustrated by Brixner U.S. Pat. No. 4,225,653. Rare earth-activated gadolinium and yttrium middle chalcogen phosphors are illustrated by Royce U.S. Pat. No. 3,418,246. Rare earth-activated lanthanum and lutetium middle chalcogen phosphors are illustrated by Yocom U.S. Pat. No. 3,418,247. Terbium-activated lanthanum, gadolinium, and lutetium oxysulfide phosphors are illustrated by Buchanan et al U.S. Pat. No. 3,725,704. Cerium-activated lanthanum oxychloride phosphors are disclosed by Swindells U.S. Pat. No. 2,729,604. Terbium-activated and optionally cerium-activated lanthanum and gadolinium oxyhalide phosphors are disclosed by Rabatin U.S. Pat. No. 3,617,743 and Ferri et al U.S. Pat. No. 3,974,389. Rare earth-activated rare earth oxyhalide phosphors are illustrated by Rabatin U.S. Pat. Nos. 3,591,516 and 3,607,770. Terbium-activated and ytterbium-activated rare earth oxyhalide phosphors are disclosed by Rabatin U.S. Pat. No. 3,666,676. Thulium-activated lanthanum oxychloride or oxybromide phosphors are illustrated by Rabatin U.S. Pat. No. 3,795,814. A $(Y,Gd)_2O_2S:Tb$ phosphor wherein the ratio of yttrium to gadolinium is between 93:7 and 97:3 is illustrated by Yale U.S. Pat. No. 4,405,691. Non-rare earth coactivators can be employed, as illustrated by bismuth and ytterbium-activated lanthanum oxychloride phosphors disclosed in Luckey et al U.S. Pat. No. 4,311,487. The mixing of phosphors as well as the coating of phosphors in separate layers of the same screen are specifically recognized. A phosphor mixture of calcium tungstate and yttrium tantalate is illustrated by Patten U.S. Pat. No. 4,387,141. However, in general neither mixtures nor multiple phosphor layers within a single screen are preferred or required.

The optimum assembly performance is realized when the optimum level of front screen X radiation absorption is achieved with the thinnest possible front screen phosphor layer. This requires use of phosphors with the highest absorption efficiencies known. Thus, the optimum phosphors for construction of the front screen are calcium tungstate and niobium-activated or thulium-activated yttrium tantalate for ultraviolet and blue light emissions and terbium-activated gadolinium or lutetium oxysulfide for green light emissions.

The phosphors can be used in any conventional particle size range and distribution. It is generally appreciated that sharper images are realized with smaller mean particle sizes, but light emission efficiency declines with decreasing particle size. Thus, the optimum mean particle size for a given application is a reflection of the balance between imaging speed and image sharpness desired. Conventional phosphor particle size ranges and distributions are illustrated in the phosphor teachings cited above.

The same order of preference applies for phosphors used in the back screen as indicated above for the front screen. However, the lower permissible MTF's and greater thicknesses of the back screen permit phosphors of somewhat lower efficiencies of absorption and/or emission to be employed while still satisfying acceptable imaging characteristics.

While it is recognized that the phosphor layers need not contain a separate binder, in most applications the phosphor layers contain sufficient binder to give structural coherence to the phosphor layer. In general the binders useful in the practice of the invention are those conventionally employed in the art. Binders are generally chosen from a wide variety of known organic polymers which are transparent to X radiation and emitted light. Binders commonly employed in the art include sodium o-sulfobenzaldehyde acetal of poly(vinyl alcohol); chlorosulfonated poly(ethylene); a mixture of macromolecular bisphenol poly(carbonates) and copolymers comprising bisphenol carbonates and poly(alkylene oxides); aqueous ethanol soluble nylons; poly(alkyl acrylates and methacrylates) and copolymers of poly(alkyl acrylates and methacrylates with acrylic and methacrylic acid); poly(vinyl butyral); and poly(urethane)elastomers. These and other useful binders are disclosed in U.S. Pat. Nos. 2,502,529; 2,887,379; 3,617,285; 3,300,310; 3,300,311; and 3,743,833; and in *Research Disclosure*, Vol. 154, February 1977, Item 15444, and Vol. 182, June 1979. *Research Disclosure* is published by Kenneth Mason Publications, Ltd., Emsworth, Hampshire P010 7DD, England. Particularly preferred binders are poly(urethanes), such as those commercially available under the trademark Estane from Goodrich Chemical Co., the trademark Permuthane from the Permuthane Division of Beatrice Foods Co., and the trademark Cargill from Cargill, Inc.

Any conventional ratio of phosphor to binder can be employed. Generally thinner phosphor layers and sharper images are realized when a high weight ratio of phosphor to binder is employed. Preferred phosphor to binder ratios are in the range of from about 10:1 to 25:1 for screen constructions intended to equal commercial screen exposure repetitions without loss of structural integrity. For limited or single exposure applications it is, of course, appreciated that any minimal amount of binder consistent with structural integrity is satisfactory.

In those instances in which it is desired to reduce the effective thickness of a phosphor layer below its actual thickness the phosphor layer is modified to impart a small, but significant degree of light absorption. If the binder is chosen to exhibit the desired degree of light absorption, then no other ingredient of the phosphor layer is required to perform the light attenuation function. For example, a slightly yellow transparent polymer will absorb a significant fraction of phosphor emitted blue light. Ultraviolet absorption can be similarly achieved. It is specifically noted that the less structurally complex chromophores for ultraviolet absorption particularly lend themselves to incorporation in polymers.

In most instances a separate absorber is incorporated in the phosphor layer to reduce its effective thickness. The absorber can be a dye or pigment capable of absorbing light within the spectrum emitted by the phosphor. Yellow dye or pigment selectively absorbs blue light emissions and is particularly useful with a blue emitting phosphor. On the other hand, a green emitting phosphor is better used in combination with magenta dyes or pigments. Ultraviolet emitting phosphors can be used with known ultraviolet absorbers. Black dyes and pigments are, of course, generally useful with phosphors, because of their broad absorption spectra. Carbon black is a preferred light absorber for incorporation in the phosphor layers. Luckey and Cleare U.S. Pat. No. 4,259,588, here incorporated by reference, teaches that increased sharpness (primarily attributable to reduced crossover, discussed below) can be achieved by incorporating a yellow dye in a terbium-activated gadolinium oxysulfide phosphor layer.

Apart from the phosphor layers and the assembly features described above, the screen can be of any conventional construction. The patents cited above for phosphor teachings also disclose typical screen constructions. The screen supports are most commonly film supports of high dimensional integrity, such as poly(ethylene terephthalate) film supports. For best image definition, when the front screen support and subbing and anticurl layers are transparent, the phosphor layer contains an absorber or a black surface is positioned adjacent the anticurl layer during exposure. For example, a black poly(vinyl chloride) or paper sheet can be positioned adjacent the anticurl layer. Typically the adjacent interior surface of the cassette in which the assembly is mounted is a black polyurethane (or similar polymeric) foam layer, which can be relied upon for light absorption contributing to image sharpness. When the screen supports are not themselves black, best sharpness levels are realized when a black film or paper is interposed between the cassette and each screen of the image recording assembly. Independently of cassette construction the front screen support and/or its subbing and anticurl layers can be black or suitably colored to absorb emitted light, thereby minimizing light reflection and image sharpness degradation. The back screen support as well as its subbing and anticurl layers can be of the same form as described for the front screen. If desired to increase speed, both the front and back screen supports and/or their subbing and anticurl layers can be reflective of emitted light.

For example, a blue or white back screen support can be chosen to reflect light emitted by calcium tungstate or rare earth-activated yttrium tantalate or a green or white support can be chosen to reflect light emitted from a rare earth-activated lutetium or gadolinium oxysulfide phosphor. Titania is preferably coated on or incorporated in the front and back screen supports to maximize reflection of green light. Metal layers, such as aluminum, can be used to enhance reflection. Paper supports, though less common for intensifying screens than film supports, are known and can be used for specific applications. Dyes and pigments are commonly loaded into supports to enhance absorption or reflection of light. Air can be trapped in supports to reflect ultraviolet light. Intensifying screen supports and the subbing layers used to improve coating adhesion can be chosen from among those employed for silver halide photographic and radiographic elements, as illustrated by *Research Disclosure*, Vol. 176, December 1978, Item 17643, Section XVII, and *Research Disclosure*, Vol. 184, August 1979, Item 18431, Section I, the disclosures of which are here incorporated by reference.

An overcoat, though not required, is commonly located over the phosphor layer for humidity and wear protection. The overcoat can be chosen using the criteria described above for the binder. The overcoat can be chosen from among the same polymers used to form either the screen binder or the support, with the requirements of toughness and scratch resistance usually favoring polymers conventionally employed for film supports. For example, cellulose acetate is a preferred overcoat used with the preferred poly(urethane) binders. Overcoat polymers are often used also to seal the edges of the phosphor layer.

While anticurl layers are not required for the screens, they are generally preferred for inclusion. The function of the anticurl layer is to balance the forces exerted by the layers coated on the opposite major surface of the screen support which, if left unchecked, cause the screen to assume a non-planar configuration—e.g., to curl or roll up on itself. Materials forming the anticurl layers can be chosen from among those identified above for use as binders and overcoats. Generally an anticurl layer is formed of the same polymer as the overcoat on the opposite side of the support. For example, cellulose acetate is preferred for both overcoat and anticurl layers.

To prevent blocking, particularly adhesion of the radiographic element and intensifying screen, the overcoats of the phosphor layers can include a matting agent, although matting agents are more commonly included in radiographic elements than in screens. Useful matting agents can be chosen from among those cited by *Research Disclosure*, Item 17643, cited above, Section XVI. A variety of other optional materials can be included in the surface coatings of the intensifying screens, such as materials to reduce static electrical charge accumulation, plasticizers, lubricants, and the like, but such materials are more commonly included in the radiographic elements which come into contact with the intensifying screens.

Conventional radiographic elements known to be useful with a pair of intensifying screens can be employed in combination with the screen pair of this invention. As noted above, two radiographic elements with single sided emulsion coatings can be mounted in back to back relationship with each emulsion coating adjacent one of the intensifying screens. As a practical matter, however, dual coated radiographic elements are almost always employed in combination with intensifying screen pairs. The construction of conventional radiographic elements is reviewed in *Research Disclosure*, Item 18431, cited above, here incorporated by reference.

Since the aim of the present invention is to advance the state of the art in terms of the speed, sharpness, and image noise relationships of the radiographic image, it follows that the preferred radiographic elements for use with the screen pair of the invention are those which also exhibit the most desirable speed, sharpness, and image noise (granularity) relationships heretofore attained in the art. Using the intensifying screen pair of this invention in combination with such high performance radiographic elements produces outstanding results. Very large reductions in patient X radiation exposure can be realized while maintaining acceptable levels of sharpness. Speed enhancements, of course, allow unsharpness from sources such as those attributable to patient movement or geometrical considerations (e.g., distance from the focal spot to the examined tissue) to be reduced and allow techniques for improving imaging which would otherwise require increased patient X ray exposure. Since the granularity of radiographic elements also increases with speed, the preferred radiographic elements are those that exhibit the best achievable speed-granularity relationships, such as those illustrated by Kofron et al U.S. Pat. No. 4,439,520 and Maskasky U.S. Pat. No. 4,435,501.

The most important sharpness affecting consideration in choosing a high performance dual coated silver halide radiographic element is crossover. When light emitted by one intensifying screen is not absorbed by the silver halide emulsion layer or layers on the adjacent surface of the radiographic element, but penetrates the radiographic support—i.e., crosses over—and exposes one or more silver halide emulsion layers coated on the opposite face of the radiographic element, the crossover exposure degrades image sharpness.

A number of techniques are known for reducing crossover exposure. The most common approach is to locate a light absorbing layer beneath the primary imaging silver halide emulsion layer or layers on each surface of the support. The absorbing layer can itself be a silver halide emulsion layer. These as well as other conventional approaches to crossover exposure reduction are disclosed in *Research Disclosure*, Item 18431, cited above, Section V, here incorporated by reference. Van Stappen U.S. Pat. No. 3,923,515 illustrates an approach for reducing cross-over with a blue emitting (e.g., calcium tungstate) intensifying screen pair while Van Doorselaer U.S. Pat. Nos. 4,130,428 and 4,130,429 illustrate crossover reduction with a green emitting (rare earth-activated oxysulfide or oxyhalide) intensifying screen pair.

The disadvantage of these conventional approaches to crossover reduction is that, while they improve image sharpness, they also significantly reduce imaging speed. Recently it has been recognized quite unexpectedly that by employing high aspect ratio or thin, intermediate aspect ratio tabular grain emulsions in a dual coated radiographic element improvements in either or both imaging speed and sharpness can be realized. Stated another way, reduction in crossover can be realized without paying any speed penalty. Therefore, the preferred dual coated radiographic elements contemplated for use with the intensifying screen pairs of this invention are those containing one or more silver halide emulsion layers which can be characterized as either high aspect ratio tabular grain emulsion layers or thin, intermediate aspect ratio tabular grain emulsion layers.

In one form the preferred dual coated radiographic elements contain a high aspect ratio tabular grain emulsion coated on each of the major faces of a transparent film support. For blue emitting phosphors the preferred emulsions are those in which tabular silver bromide or bromoiodide grains having a thickness of less than 0.5 $\mu$m, a diameter of at least 0.6 $\mu$m, and an average aspect ratio of greater than 8:1 account for at least 50 percent of the total grain projected area in the emulsion. A blue spectral sensitizing dye is adsorbed to the surface of the grains. For green emitting screens the preferred emulsions are those in which tabular silver bromide or bromoiodide grains having a thickness of less than 0.3 $\mu$m, a diameter of at least 0.6 $\mu$m, and an average aspect ratio of greater than 8:1 account for at least 50 percent of the total grain projected area in the emulsion. A green spectral sensitizing dye is adsorbed to the surface of the grains. These dual coated radiographic elements are illustrated by Abbott et al U.S. Pat. No. 4,425,425.

In another form the preferred dual coated radiographic elements contain a thin, intermediate aspect ratio tabular grain emulsion coated on each of the major faces of a transparent film support. The preferred emulsions are those in which tabular silver bromide or bromoiodide grains having a thickness of less than 0.2 $\mu$m and an average aspect ratio of from 5:1 to 8:1 account for at least 50 percent of the total grain projected area in the emulsion. A blue or green spectral sensitizing dye is adsorbed to the surface of the grains. These dual coated radiographic elements are illustrated by Abbott et al U.S. Pat. No. 4,425,426.

Preparation of the tabular grain emulsions and their optimum chemical and spectral sensitizations are disclosed by Wilgus et al U.S. Pat. No. 4,434,226; Kofron et al U.S. Pat. No. 4,439,520; and Solberg et al U.S. Pat. No. 4,433,048. These radiographic elements can be hardened as taught by Dickerson U.S. Pat. No. 4,414,304. Preferred dual coated radiographic elements are those which have a crossover rating of less than 20%, measured as disclosed by Abbott et al U.S. Pat. Nos. 4,425,425 and 4,425,426.

Having described a variety of alternative preferred radiographic element and intensifying screen pair assemblies, the following are intended as specific illustrations of optimum arrangements:

ASSEMBLY A

Referring to FIG. 2, in one preferred form an assembly similar to the assembly 7 when intended to be employed for mammographic examination using low energy X radiation of an energy level below 30 keV is constructed using subbed poly(ethylene terephthalate) film supports 29, 41, and 49. The support 29 is either transparent or dyed to a blue tint. The supports 41 and 49 are black. The phosphor layers 45 and 53 are constructed using calcium tungstate phosphor particles in a poly(urethane) binder in a phosphor to binder weight ratio of from 10:1 to 25:1. The front screen phosphor layer exhibits modulation transfer factors greater than those of Curve A in FIG. 3 when comparably measured. The front screen phosphor layer is capable of attenuating by 40 to 45 percent the X radiation produced by a Mo target tube operated at 28 kVp with a three phase power supply, wherein the reference X radiation exposure passes through 0.03 mm of Mo and 4.5 cm of poly(methyl methacrylate) to reach the phosphor layer mounted 25 cm from a Mo anode of the target tube and attenuation is measured 50 cm beyond the phosphor layer. To realize preferred MTF levels the front screen phosphor layer is preferably from about 25 to 35 $\mu$m in thickness, which corresponds to its effective thickness, no absorber being present. The back screen phosphor layer is intended to absorb at least 60 percent of the X radiation which it receives from the front screen during the reference exposure. The back screen phosphor layer exhibits modulation transfer factors greater than those of Curve B in FIG. 3 when comparably measured. Again, to realize preferred MTF levels, the back phosphor screen is preferably from 60 to 100 $\mu$m in effective thickness. The overcoats 47 and 55 as well as the anticurl layers 57 and 59 of the screens are formed of cellulose acetate. The emulsion layers 35 and 37 are coarse octahedral or nontabular irregular grain silver bromoiodide emulsion layers substantially optimally chemically sensitized, but not spectrally sensitized, since native absorption is relied upon to capture blue light. Between each of the emulsion layers 35 and 37 and its support is an additional silver bromoiodide emulsion layer (not shown in FIG. 2). These additional emulsion layers can take the form of any relatively fine grain silver bromoiodide emulsion which is at least 0.3 log E slower than the emulsion of layers 35 and 37, radiographic elements of this type being disclosed by van Stappen U.S. Pat. No. 3,923,515.

ASSEMBLY B

In another preferred form the assembly 7 when intended to be employed for mammographic examination using low energy X radiation of an energy level below 30 keV is sandwiched between black poly(vinyl chloride) or paper sheets and is constructed using subbed poly(ethylene terephthalate) film supports 29, 41, and 49. The support 29 is either transparent or dyed to a blue tint. The supports 41 and 49 are blue or coated on the surface with a blue dye containing layer. The phosphor layers 45 and 53 are constructed using terbium-activated gadolinium oxysulfide phosphor particles in a poly(urethane) binder in a phosphor to binder weight ratio of from 10:1 to 25:1. The front screen phosphor layer exhibits modulation transfer factors greater than those of Curve A in FIG. 3 when comparably measured and preferably at least 1.1 times greater over the range of from 5 to 10 cycles per mm. The front screen phosphor layer is capable of attenuating by 40 to 45 percent the X radiation produced by a Mo target tube operated at 28 kVp with a three phase power supply, wherein the reference X radiation exposure passes through 0.03 mm of Mo and 4.5 cm of poly(methyl methacrylate) to reach the phosphor layer mounted 25 cm from a Mo anode of the target tube and attenuation is measured 50 cm beyond the phosphor layer. To realize preferred MTF levels the front screen phosphor layer is preferably from about 25 to 35 $\mu$m in effective thickness. The back screen phosphor layer is intended to absorb at least 60 percent of the X radiation which it receives from the front screen during the reference exposure and, to realize preferred MTF levels, is preferably from 60 to 100 $\mu$m in effective thickness. Although the effective thickness of each of the front and back screens is preferably the actual thickness, no absorber being present, up to 0.006 percent carbon in the front screen and up to 0.003 percent carbon in the back screen is compatible with high performance levels. The back screen phosphor layer exhibits modulation transfer factors greater than that of Curve B in FIG. 3 when comparably measured, preferably at least 1.1 times greater over the range of from 1 to 10 cycles per mm and optimally at least twice that of Curve B over the range of from 5 to 10 cycles per mm. The overcoats 47 and 55 of the screens are formed of cellulose acetate. The emulsion layers 35 and 37 are high aspect ratio tabular grain silver bromide or silver bromoiodide emulsion layers substantially optimally chemically sensitized and spectrally sensitized with a spectral sensitizing dye that absorbs green light. The tabular grains having a thickness of less than 0.3 $\mu$m and a diameter of at least 0.6 $\mu$m have an average aspect ratio of greater than 8:1 and account for greater than 50 percent of the total grain projected area. The overcoat layers 36 and 39 are gelatin layers containing transparent polymer beads acting as matting agent particles. The radiographic element 23 exhibits a crossover of less than 25 percent using the single screen crossover measurement method for dual coated radiographic elements disclosed by Huff et al, "Crossover and MTF Characteristics of a Tabular-Grain X-Ray Film", SPIE, Vol. 486, Medical Imaging and Instrumentation '84, 1984, pp. 92 through 98.

ASSEMBLY C

In still another preferred form the assembly 7 when intended to be employed for mammographic examination using low energy X radiation of an energy level below 30 keV is constructed using subbed poly(ethylene terephthalate) film supports 29, 41, and 49. The support 29 is either transparent or dyed to a blue tint. The supports 41 and 49 are blue or coated on the surface with a blue dye or ultraviolet absorber containing layer. To reduce unwanted reflections from the supports 41 and 49 the image recording assembly is sandwiched between black film, paper, or foam sheets. The phosphor layers 45 and 53 are constructed using niobium-activated or thulium-activated yttrium or lutetium tantalate phosphor particles in a poly(urethane) binder in a phosphor to binder weight ratio of from 10:1 to 25:1. The front screen phosphor layer exhibits modulation transfer factors greater than those of Curve A in FIG. 3 when comparably measured and preferably at least 1.1 times greater over the range of from 5 to 10 cycles per mm. The front screen phosphor layer is capable of attenuating by 40 to 45 percent the X radiation produced by a Mo target tube operated at 28 kVp with a three phase power supply, wherein the reference X radiation exposure passes through 0.03 mm of Mo and 4.5 cm of poly(methyl methacrylate) to reach the phosphor layer mounted 25 cm from a Mo anode of the target tube and attenuation is measured 50 cm beyond the phosphor layer. To realize preferred MTF levels the front screen phosphor layer is from about 25 to 35 $\mu$m in thickness, which corresponds to its effective thickness, no absorber being present. However, up to 0.006 percent carbon in the front screen is compatible with high performance levels. The back screen phosphor layer is intended to absorb at least 60 percent of the X radiation which it receives from the front screen during the reference exposure and, to realize preferred MTF levels, is from 60 to 100 $\mu$m in effective thickness. The effective thickness preferably corresponds to the actual thickness, but up to 0.003 percent carbon can be present while achieving high performance levels. The back screen phosphor layer exhibits modulation transfer factors greater than those of Curve B in FIG. 3 when comparably measured, preferably at least 1.1 times greater over the range of from 1 to 10 cycles per mm and optimally at least twice that of Curve B over the range of from 5 to 10 cycles per mm. The overcoats 47 and 55 as well as the anticurl layers 57 and 59 of the screens are formed of cellulose acetate. The emulsion layers 35 and 37 are thin, intermediate aspect ratio tabular grain silver bromide or silver bromoiodide emulsion layers substantially optimally chemically sensitized and spectrally sensitized with a spectral sensitizing dye that absorbs blue light. The blue absorbing dye is particularly useful as a sensitizer when the thulium activated phosphor is employed and functions primarily to reduce crossover when the niobium activated phosphor is employed. The tabular grains having a thickness of less than 0.2 $\mu$m have an average aspect ratio of from 5:1 to 8:1 and account for greater than 50 percent of the total grain projected area. The overcoat layers 36 and 39 are gelatin layers containing transparent polymer beads acting as matting agent particles. The radiographic element 23 exhibits a crossover of less than 25 percent.

EXAMPLES

The invention can be better appreciated by reference to the following specific examples and comparative investigations.

CHOICE OF FILMS

For testing the performance of pairs of screens emitting in the green a film having a green sensitized silver halide emulsion layer coated on each side of the support was chosen, hereinafter designated Film A.

Film A was prepared according to the teachings of Abbott et al U.S. Pat. No. 4,425,425 in the following manner: On each side of a polyester support is coated an emulsion layer containing high aspect ratio tabular silver bromide grains of average diameter about 1.75 $\mu$m and thickness about 0.11 $\mu$m at 1.98 g/m$^2$ Ag and 2.85 g/m$^2$ gelatin. The emulsion was selenium, sulfur, and gold chemically sensitized, and spectrally sensitized with 70 mg/Ag mole of Dye I, anhydro-5,5'-dichloro-9-ethyl-3,3'-bis(3-sulfopropyl)oxacarbocyanine hydroxide, triethyl amine salt. A protective overcoat was applied to each side containing 0.72 gr/m$^2$ gelatin.

For testing the MTF of single screens emitting in the green a film having a green sensitized silver halide emulsion layer coated on one side of the support was chosen, hereinafter designated Film B.

Film B was prepared in the following manner: On a polyester support was coated an emulsion layer containing silver bromoiodide grains (1.7 mole percent iodide) of average diameter about 0.78 $\mu$m at 5.11 g/m$^2$ Ag and 3.82 g/m$^2$ gelatin. The emulsion was chemically sensitized with sulfur and gold and spectrally sensitized with 88 mg/Ag mole of Dye I, anhydro-5,5'-dichloro-9-ethyl-3,3'-bis(3-sulfopropyl)oxacarbocyanine hydroxide, triethyl amine salt, and 89 mg/Ag mole of Dye II, anhydro-5-chloro-9-ethyl-5'-phenyl-3'(3-sulfobutyl)-3-(3-sulfopropyl)oxacarbocyanine hydroxide, triethylamine salt. A protective overcoat was applied containing 0.89 g/m$^2$ gelatin. On the opposite side of the support was applied an antihalation layer containing 4.64 g/m$^2$ gelatin.

For testing the performance of pairs of screens emitting in the blue a film having a blue sensitized silver halide emulsion layer coated on each side of the support was chosen, hereinafter designated Film C.

Film C was was prepared in the following manner: On each side of a polyester support was coated an emulsion layer containing silver bromoiodide grains (3.4 mole % iodide) of average diameter 0.72 $\mu$m, at 2.15 g/m$^2$ Ag, and 1.54 g/m$^2$ synthetic polymer extended gelatin vehicle. The emulsion was chemically sensitized with selenium, sulfur, and gold.

For testing the MTF of single screens emitting in the blue a film having a blue sensitive silver halide emulsion layer coated on one side of the support was chosen, hereinafter designated Film D.

Film D was prepared similarly as Film B, except that Dye I and Dye II were each present in a concentration of 69 mg/Ag mole. Note that while Film D was therefore green sensitized, the native blue sensitivity was primarily relied upon for imaging.

GREEN EMITTING PHOSPHOR SCREENS

A high resolution screen, S, which has a composition and structure corresponding to that of commercial high resolution screens was chosen for comparative testing. Screen S consists of Gd$_2$O$_2$S:Tb phosphor with a particle size distribution having a peak frequency of 5 $\mu$m with a log scale Gaussian error distribution ranging from about 2 to 20 $\mu$m, coated in poly(urethane) binder (ESTANE ®), with 0.0015% carbon (by weight) of phosphor at a total coverage of about 34.4 mg/cm$^2$ (corresponding to a phosphor coverage of 32.9 mg/cm²). The phosphor to binder ratio (by weight) is about 22:1 and the coating is made on blue-dyed polyester support. The screen is overcoated with cellulose acetate, and the back of the screen is coated with cellulose acetate to control curl.

A green emitting screen 143A4 was prepared in the following manner: A $Gd_2O_2S:Tb$ phosphor was ground, then refired for 1 hour at 800° C. in a nitrogen atmosphere and slowly cooled in a nitrogen atmosphere. Then 0.3 gram of a 5 percent by weight carbon dispersion, 47.6 grams of a 15 percent by weight solution of ESTANE® poly(urethane), and the 150 grams of the terbium-activated gadolinium oxysulfide phosphor were mixed to make a dispersion with 80 percent solids. This dispersion was then coated on a subbed polyester support which contained titania particles. The coating was overcoated with cellulose acetate.

A green emitting screen 121A4 was prepared in the following manner: A $Gd_2O_2S:Tb$ phosphor was ground, then refired for 1 hour at 800° C. to produce a distribution of particle sizes having a peak frequency of 5 μm with a log scale Gaussian error distribution ranging from about 2 to 20 μm. About 200 grams of this phosphor was mixed with about 105 grams of a 10% solution of an aliphatic poly(urethane), PERMUTHANE U-6366®, in 92.7% methylene chloride and 7.3% methanol by weight, to make a dispersion with about 74.8% solids. This dispersion was then coated on subbed polyester blue-dyed support. All of the coatings were overcoated with cellulose acetate.

Characteristics of these and similarly prepared green emitting screens are summarized in Table I. The green emitting screens are considered to differ significantly only in their effective thicknesses. The weight ratio of phosphor to binder appears under the heading P/B Ratio.

PREPARATIONS OF BLUE EMITTING PHOSPHOR SCREENS

About 120 grams of niobium-activated yttrium tantalate phosphor were mixed with 38 grams of a 15 percent by weight solution of ESTANE® poly(urethane) binder in tetrahydrofuran which also contained 0.036 gram of a 5% carbon dispersion. This dispersion was then coated on a subbed polyester support which contained blue dye. The coating was overcoated with cellulose acetate. The resulting screen was labeled 1A. The characteristics of this screen are summarized in Table I.

About 150 grams of the same niobium-activated yttrium tantalate phosphor was mixed with 79 grams of a 10 percent by weight solution of PERMUTHANE U-6366® poly(urethane) binder in 92.7 percent by weight methylene chloride and 7.3 percent by weight methanol to form a dispersion with 71.4 percent solids. This dispersion was coated on a support and overcoated as described above. The resulting screen was labeled 1D. Characteristics of this screen are summarized in Table I.

TABLE I

Intensifying Screens for Mammography

| Screen | (Polyester) Support | Phosphor Coverage (mg/cm²) | Thickness (μm) | % Voids | % Carbon | P/B Ratio |
|---|---|---|---|---|---|---|
| 143 A4 | White | 12.9 | 31 | 23 | .01 | 21 |
| 20 A2 | Blue | 13.6 | 36 | 33 | .0015 | 21 |
| 34 A2 | Blue | 17.0 | 40 | 24 | 0. | 19 |
| 121 A4 | Blue | 19.9 | 56 | 36 | 0. | 19 |
| 37 A2 | Blue | 28.0 | 66 | 24 | 0. | 19 |
| 37 A3 | Blue | 24.6 | 58 | 24 | 0. | 19 |
| 14 A1 | Blue | 30.1 | 74 | 26 | 0. | 19 |
| S | Blue | 32.9 | 79 | 22 | .0015 | 22 |
| 1 A | Blue | 11.9 | 23 | 9 | .0015 | 21 |
| 1 D | Blue | 31.0 | 66 | 17 | 0. | 19 |

COMPARATIVE COMMERCIAL SCREEN

For the purpose of demonstrating the characteristics and performance of Trimax-2 screens, the use of which was suggested by Nishikawa et al, cited above, two Trimax-2 screens were purchased. These screens employ terbium-activated gadolinium oxysulfide as the phosphor.

MEASUREMENT OF SCREEN ATTENUATION

Each of the screens listed in Table I was examined to determine the degree to which the phoshor containing coating attenuated low intensity X radiation. This was done by mounting each screen 25 cm from a molybdenum anode target of X radiation producing tube. The tube was operated at 28 kVp with a three phase power supply. The X radiation exposure passed through 0.03 mm of Mo and 4.5 cm of poly(methyl methacrylate) to reach the phosphor layer. Attenuation was measured 50 cm beyond the phosphor containing layer using a Radcal 20X5-6M ion chamber. The X radiation from the tube was collimated by lead apertures so that the diameter of the circular cross sectional area of the beam was about 8 cm. To eliminate the attenuation produced by the support, the attenuation measurement was repeated using the screen support with the phosphor layer absent. The percent attenuation of the phosphor layer was calculated using the formula:

$$\% \text{ Atten.} = \frac{100 \text{ (Radiation Support} - \text{Radiation Screen)}}{\text{Radiation Support}}$$

Thus, a screen which permitted the same amount of radiation to reach the detector with its phosphor layer present as with its phosphor layer absent would exhibit zero percent attenuation.

Attenuations for the screens are listed in Table II.

TABLE II

| Screen | Attenuation |
|---|---|
| 143 A4 | 42 |
| 20 A2 | 44 |
| 34 A2 | 54 |
| 121 A4 | 59 |
| 37 A2 | 67 |
| 37 A3 | 71 |
| 14 A1 | 71 |
| S | 80 |
| 1 A | 50 |
| 1 D | 85 |
| Trimax-2 | 70 |

MTF MEASUREMENTS

The MTF's of the screens of Tables I and II were measured following the procedure of Doi et al, "MTF's and Wiener Spectra of Radiographic Screen-Film Systems", cited above. The method was modified for greater accuracy by using three levels of exposure for the line spread function (LSF) instead of the two levels used by Doi et al. Also, the X ray beam energy spectrum was modified to simulate the X ray spectrum leaving an average breast when a Mo target X ray tube is used. The X ray tube load limitations required use of multiple exposures in making the sensitometric exposures for calibrating the line exposures.

In making the measurements that are reported below, an exposure is determined with the slit apparatus, so that the exposure line on the developed film has a maximum density well within the exposure latitude of the film; normally in the range of developed densities between 1.8 and 2.0. The width of the slits employed was about 10 $\mu$m. When the time for exposing the slit image was determined, a trial sensitometric exposure was made with the inverse square law sensitometer. The exposure times for both types of exposures were made equal to prevent errors caused by reciprocity failure of the film. In making back screen exposures, a black paper sheet was placed against the jaws of the slit apparatus, a single-sided film (Film B or D, depending on whether the screen being tested was green or blue emitting) with its support in contact with the paper sheet, and finally the phosphor side of the screen was placed in contact with the emulsion side of the film. Another sheet of black paper was placed behind the screen support and then the assembly was held in intimate contact with another plastic sheet and a vacuum.

When making front screen exposures, black paper was placed against the slits, then the screen, with the support facing the X ray source, then the single coated film with its emulsion coating in contact with the screen, then another layer of black paper, and finally a layer of black plastic to maintain vacuum contact. The remainder of the procedure was the same as described above.

The slit exposures were performed with a tungsten target tube driven by a three phase power supply at 28 kVp. The X rays from this tube passed through a filter pack consisting of 50 $\mu$m of molybdenum and 0.9 mm of aluminum located at the tube window. The inherent filtration of the tube window is approximately equivalent to that of 0.9 mm aluminum. The spectral quality of the X ray beam reaching the slit assembly and hence the energy absorption at various depths in the phosphor layer is equivalent to that of the exit spectrum from a phantom consisting of 4.5 cm of poly(methylmethacrylate) that is exposed with a molybdenum target X ray tube that has a 0.03 mm molybdenum filter and is operated at 28 kVp by a three phase power supply.

After making trial exposures, a final set of exposures was made at three exposure levels, 1× (as described above), 4× (four times the levels described above), and 14×. The three levels were used to minimize truncation errors in calculating the LSF. Because the X ray intensity under the above conditions was low, the time of the 1× exposure was 3 seconds. To make the 4× and 14× exposures it was necessary to make multiple exposures, which introduced intermittency effects. To correct for these effects, three levels of intermittent sensitometric exposures (with ratios of 1:4:14) were also made, so that the curve shape for all of the samples was accurately measured. The times between the intermittent sensitometric and MTF exposures as well as the times between these exposures and processing were maintained constant.

The exposed films were processed in a Kodak X-Omat RP ® processor, Model M6AW, using Kodak RP X-Omat developer replenisher and Kodak RP X-Omat fixer and developer replenisher.

After the samples were processed, they were scanned with a Perkin-Elmer ®1010A microdensitometer. The optics and the illumination and pickup slits of the microdensitometer were set so that the X ray images were measured with 1 $\mu$m increments. The sensitometric exposures were scanned along with the X ray lines and all of the data were transferred to magnetic tape.

The magnetic tape from the microdensitometer was loaded into a computer. The various component line images were converted from density into relative exposure, then merged into a composite LSF from which the system MTF was calculated using the methods described by Doi et al, cited above.

The MTF results of these measurements are summarized in Table III. The lower limit front screen MTF in Table III is plotted in FIG. 3 as Curve A. The lower limit back screen MTF in Table III is plotted in FIG. 3 as Curve B. The lower limits were selected by skilled observers after viewing and comparing images produced by various screen-film assemblies.

TABLE III

Modulation Transfer Factors of Experimental Mammographic Screens
% Modulation Transfer Factor at Various Cycles/mm

|  | 0 | 1.0 | 2.0 | 3.0 | 4.0 | 5.0 | 6.0 | 7.0 | 8.0 | 9.0 | 10.0 |
|---|---|---|---|---|---|---|---|---|---|---|---|
| Measured as Front Screen | | | | | | | | | | | |
| 1 A | 100 | 98.2 | 93.4 | 86.4 | 78.4 | 70.2 | 62.4 | 55.2 | 48.7 | 42.9 | 37.8 |
| 20 A2 | √ | 97.6 | 91.3 | 82.6 | 73.2 | 64.1 | 55.6 | 48.5 | 42.1 | 36.5 | 31.6 |
| 34 A2 | √ | 97.3 | 90.1 | 80.5 | 70.3 | 60.7 | 52.0 | 44.4 | 37.9 | 32.2 | 27.5 |
| 143 A4 | √ | 96.6 | 88.3 | 78.4 | 69.0 | 60.6 | 53.1 | 46.6 | 40.8 | 35.7 | 31.2 |
| 121 A4 (Lower Limit) | √ | 95.1 | 83.7 | 70.9 | 59.2 | 49.2 | 40.9 | 33.9 | 28.3 | 23.6 | 19.9 |
| 37 A3 | √ | 95.8 | 85.2 | 72.3 | 59.8 | 49.0 | 39.9 | 32.5 | 26.5 | 21.7 | 17.8 |
| 14 A1 | √ | 95.2 | 83.6 | 70.2 | 57.8 | 47.4 | 38.9 | 32.0 | 26.6 | 22.3 | 19.0 |
| 37 A2 | √ | 94.4 | 81.1 | 65.9 | 52.3 | 41.0 | 32.1 | 25.2 | 19.9 | 16.0 | 13.0 |
| S | √ | 92.4 | 77.6 | 61.9 | 48.8 | 38.3 | 30.1 | 23.8 | 19.1 | 15.6 | 12.9 |
| Trimax-2 | √ | 91.8 | 73.9 | 56.2 | 42.1 | 31.6 | 24.1 | 18.8 | 15.1 | 12.3 | 10.2 |
| Measured as Back Screen | | | | | | | | | | | |
| 20 A2 | 100 | 97.6 | 91.0 | 82.2 | 72.7 | 63.6 | 55.4 | 48.2 | 41.9 | 36.5 | 31.8 |
| 1 D | √ | 96.2 | 86.5 | 74.3 | 62.3 | 51.8 | 43.1 | 36.0 | 30.3 | 25.7 | 21.9 |
| 14 A1 | √ | 95.2 | 83.6 | 70.2 | 57.8 | 47.4 | 38.9 | 32.0 | 26.6 | 22.3 | 19.0 |
| S | √ | 94.0 | 80.3 | 65.8 | 53.4 | 43.4 | 35.5 | 29.3 | 24.4 | 20.6 | 17.5 |
| Trimax-2 | √ | 93.0 | 77.4 | 61.3 | 48.2 | 38.2 | 30.8 | 25.2 | 21.0 | 17.7 | 15.2 |

TABLE III-continued

Modulation Transfer Factors of
Experimental Mammographic Screens
% Modulation Transfer Factor at Various Cycles/mm

|  | 0 | 1.0 | 2.0 | 3.0 | 4.0 | 5.0 | 6.0 | 7.0 | 8.0 | 9.0 | 10.0 |
|---|---|---|---|---|---|---|---|---|---|---|---|
| (Lower Limit) | √ | 82.0 | 56.9 | 40.3 | 29.6 | 22.4 | 17.5 | 14.1 | 11.6 | 9.7 | 8.2 |

COMPARISONS OF SCREEN PAIRS

Using pairs of screens described above in combination with one of the dual coated films, Film A or Film C, depending on whether the screen pair was green or blue emitting, film samples were exposed as follows:

Each screen pair-film assembly was exposed to X radiation from a tungsten target tube operated at 28 kVp and 50 mA from a distance of 102 cm. The X rays passed through 1 mm of aluminum and a mammographic phantom or test object sold by Nuclear Associates Division, Victoreen, Inc., Cat. No. 76-000, 1983, before reaching the assembly. Following exposure the films were processed in a Kodak X-Omat RP ® processor, Model M6AW, using Kodak RP X-Omat developer replenisher and Kodak RP X-Omat fixer and developer replenisher.

Sharpness of the processed films was determined by visual examination by an observer trained in making sharpness comparisons. Films were first assigned numerical sharpness ratings, with the rating of 1 being assigned to the sharpest images. Within equal numerical ratings of sharpness the films were then compared side-by-side. Based on side-by-side comparisons the films within each numerical rating were ordered in an alphabetical order, with the rating A being given to the sharpest film. Thus, all films with a 1 rating exhibited a clear sharpness superiority over all films with a 2 rating, and all films with a 3 rating were clearly inferior in sharpness to all films with a 1 or 2 rating. Skips in the alphabetical ratings appear, since many screens with intermediate properties prepared and compared are not reported.

lished by Kunio Doi et al, cited above. The measurement procedures are more specifically described by P. C. Bunch, R. Shaw, and R. Van Metter, "Signal-to-Noise Measurements for a Screen-Film System," *Proc. SPIE*, Vol. 454, pp. 128–141. The noise power spectrum data was calibrated to diffuse density, as described by Kunio Doi et al, cited above.

For purposes of arriving at a single representative number for each screen pair constituting a fair basis for comparison, an image noise number was calculated from each noise power spectra corresponding to 1000 times the standard deviation of the density readings of the uniformly exposed and processed film obtained with a 0.4 mm diameter circular aperture at a density of about 1.1. The procedure for obtaining these data from noise power spectra is described in the reference by J. C. Dainty and R. Shaw, *Image Science*, Academic Press, New York, 1974, pp. 280–281. The justification for choosing the 0.4 mm diameter aperture is given in the article by R. Bollen, "Correlation between Measured Noise and its Visual Perception," Proc. SPIE, Vol. 626, pp. 251–258.

Table V compares the image noise (1000×the standard deviation at a 0.4 mm diameter aperture) of the control green emitting screen pair 20A2/20A2 and the green emitting example screen pairs of Table IV.

TABLE V

| Screen Pair Front/Back | Image Noise | Comment |
|---|---|---|
| 20 A2/S | 11.4 | Example |
| 34 A2/S | 12.3 | Example |
| 143 A4/S | 12.6 | Example, white support |
| 20 A2/14 A1 | 12.7 | Example |
| 20 A2/20 A2 | 16.0 | Control |

TABLE IV

| Screen Pair Front/Back | Attenuation Front/Back | Above MTF Min. Front/Back | Image Sharpness | Relative Speed | Comment |
|---|---|---|---|---|---|
| 20 A2/20 A2 | 44/44 | Yes/Yes | 1A | 145 | Control, high noise |
| 20 A2/S | 44/80 | Yes/Yes | 1B | 160 | Example |
| 143 A4/S | 42/80 | Yes/Yes | 1B | 150 | Example, white support |
| 20 A2/14 A2 | 44/71 | Yes/Yes | 1C | 215 | Example |
| 34 A2/S | 54/80 | Yes/Yes | 1C | 175 | Example |
| 1 A/1 D | 50/85 | Yes/Yes | 1C | 185 | Example, Blue emission |
| 37 A3/S | 71/80 | No/Yes | 2A | 200 | Control, inferior sharpness |
| 121 A4/S | 59/80 | No/Yes | 2B | 185 | Control, inferior sharpness |
| 37 A2/S | 67/80 | No/Yes | 2B | 185 | Control, inferior sharpness |
| 14 A1/14 A1 | 71/71 | No/Yes | 2C | 215 | Control, inferior sharpness |
| S/S | 80/80 | No/Yes | 2C | 100 | Control, inferior sharpness |
| Trimax-2/Trimax-2 | 70/70 | No/Yes | 3 | 160 | Control, inferior sharpness |

From Table IV it is apparent that all of the screen pairs satisfying the requirements of the invention exhibited high levels of sharpness, indicated by their 1 rating. On the other hand, only the one control screen pair, 20A2/20A2, received a sharpness rating of 1. This control screen pair, however, exhibited a lower speed than any of the example screen pairs.

Additionally the control screen pair, 20A2/20A2, exhibited a higher image noise than any of the green emitting screen pairs reported in Table IV. Image noise was measured by employing noise power spectrum, also referred to as Wiener spectrum, measurements. Procedures for noise power spectrum measurements are pub- From Tables IV and V it is apparent that the image sharpness of the screen pairs of the invention were superior to those of all of the control screen pairs, except screen pair 20A2/20A2. However, screen pair 20A2/20A2 was inferior to the screen pairs of the invention in speed and exhibited the highest image noise measured.

In making comparisons, it is to be specifically noted that the screen 143A4 employed a white support, while the remaining screens employed blue support. The white support had the effect of giving the screen pair 143A4/S an advantage in terms of speed, but a disadvantage in terms of sharpness.

The screen pair 1A/1D employed blue emitting phosphor and therefore required Film C, which was a blue recording film, instead of Film A, a green recording film, employed in the remaining screen pair measurements. Because of differences in contrast characteristics of Films A and C, the image noise level of screen pair 1A/1D has been excluded from the comparative listing in Table V. The image noise figure obtained for screen pair 1A/1D was 14.8.

APPENDIX I

1. J. H. Hartmann, *Fortschr. auf dem Gebiete der Rontgenstrahlen*, 43, 758–766 (1931); Verhandlungen der Deutschen Rontgen Gesellschaft 24, 56–61 (1932). The sharpness produced by intensifying screens with films that have emulsion coated on both sides of the support (dual coated films) and with single coated films increases with decreasing particle size of phosphor, with decreasing thickness of the screen coating, with decreasing reflectance of the screen support, and with use of increasing concentrations of dyes that absorb the fluorescent radiation in the screen coating. The changes that increase sharpness usually decrease speed.

2. W. Barth, J. Eggert, and K. V. Hollenben, *Veroff. des Wissenschaft. Zentral Laboratorium Agfa*, 2, 118–133 (1931). The speed of a system consisting of two screens and a dual coated film increases with increasing pigment to binder ratio in the screen coating, and when a thin front screen is used in combination with a thick back screen to expose the film. The optimum configuration of screens and films depends upon the energy of the incident x-rays.

3. R. Blank and U. Goering, *Phot. Korr.* 102, 118–126 (1966). The sharpness produced by a given set of screens with dual coating film is affected by the composition and structure of the film. It has been shown that use of opaque or colored film supports in such film decreases radiographic speed, but increases the sharpness when light from one of the screens produces substantial exposure of both emulsion layers. However, in the screen-film combinations used by these authors, the improvement in sharpness produced by such absorbing layers merely corresponds with that produced by a film without such layers that is used with screens that are slower and sharper.

4. J. Hartmann, U.S. Pat. No. 2,146,573, Feb. 7, 1939. Screens that are coated on supports which do not reflect the light emitted from the phosphor produce images with high resolution when used with films.

5. J. Hartmann, U.S. Pat. No. 2,088,595, Aug. 3, 1937. Thin fluorescent layers with thickness of about 40 to 80 μm produce images with high resolution when used with film. These layers are coated on supports that do not reflect the light emitted by the fluorescent layer and may also contain black substances or substances which absorb the emitted light in the layer itself.

6. A. Pfahl, *Rontgen Blatter* 10, 52–57, 107–117, 135–146 (1957). Review of the properties and composition of radiographic intensifying screens. Use of coatings with phosphor coverage of about 20 mg/cm$^2$ is described.

7. T. I. Abbott and C. G. Jones U.S. Pat. Nos. 4,425,425 and 4,425,426, Jan. 10, 1984. Spectrally sensitized tabular grains are disclosed to have lower crossover when dual coated and used with two intensifying screens for radiography. The spectral sensitizer is selected so that it efficiently absorbs the light emitted from the screen.

The invention has been described in detail with particular reference to preferred embodiments thereof, but it will be understood that variations and modifications can be effected within the spirit and scope of the invention.

What is claimed is:

1. A pair of front and back intensifying screens capable of providing a sharp imagewise exposure of a dual coated silver halide radiographic element to light when imagewise exposed to X-radiation predominantly of an energy level below 40 keV, the front intesifying screen being comprised of a fluorescent layer
having modulation transfer factors greater than those of reference curve A in FIG. 3 and
being capable of attenuating by 20 to 60 percent a reference X radiation exposure produced by a Mo target tube operated at 28 kVp with a three phase power supply, wherein the reference X radiation exposure passes through 0.03 mm of Mo and 4.5 cm of poly(methyl methacrylate) to reach said fluorescent layer mounted 25 cm from a Mo anode of the target tube and attenuation is measured 50 cm beyond the fluorescent layer, and the back intensifying screen
having modulation transfer factors greater than those of reference curve B in FIG. 3 and
being capable of attenuating at least 60 percent of the X radiation received from the front screen when the reference exposure is repeated with both the front and back screens present.

2. A pair of intensifying screens according to claim 1 further characterized in that said front screen is capable of attenuating by 35 to 55 percent a reference X radiation exposure produced by a Mo target tube operated at 28 kVp with a three phase power supply, wherein the reference X radiation exposure passes through 0.03 mm of Mo and 4.5 cm of poly(methyl methacrylate) to reach said fluorescent layer mounted 25 cm from a Mo anode of the target tube and attenuation is measured 50 cm beyond the fluorescent layer.

3. A pair of intensifying screens according to claim 1 further characterized in that said front screen is capable of attenuating by 40 to 45 percent a reference X radiation exposure produced by a Mo target tube operated at 28 kVp with a three phase power supply, wherein the reference X radiation exposure passes through 0.03 mm of Mo and 4.5 cm of poly(methyl methacrylate) to reach said fluorescent layer mounted 25 cm from a Mo anode of the target tube and attenuation is measured 50 cm beyond the fluorescent layer.

4. A pair of intensifying screens according to claim 1 further characterized in that said front screen fluorescent layer is comprised of a phosphor chosen from among rare earth oxychalcogenide and halide phosphors of the formula:

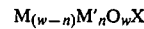

$$M_{(w-n)}M'_nO_wX$$

wherein:
M is at least one of the metals yttrium, lanthanum, gadolinium, or lutetium,
M' is at least one of the rare earth metals dysprosium, erbium, europium, holmium, neodymium, praseodymium, samarium, terbium, thulium, or ytterbium, X is a middle chalcogen (S, Se, or Te) or halogen, n is 0.0002 to 0.2, and w is 1 when X is halogen or 2 when X is chalcogen.

5. A pair of front and back intensifying screens capable of providing a sharp imagewise exposure of a dual coated silver halide radiographic element to light when imagewise exposed to X radiation predominantly of an energy level below 40 keV, the front intensifying screen being comprised of a fluorescent layer comprised of a calcium tungstate phosphor and a binder in a weight ratio of 10:1 to 25:1
      having modulation transfer factors greater than that of reference curve A in FIG. 3 and
      being capable of attenuating by 40 to 45 percent a reference X radiation exposure produced by a Mo target tube operated at 28 kVp with a three phase power supply, wherein the reference X radiation exposure passes through 0.03 mm of Mo and 4.5 cm of poly(methyl methacrylate) to reach said fluorescent layer mounted 25 cm from a Mo anode of the target tube and attenuation is measured 50 cm beyond the fluorescent layer, and the back intensifying screen
      having modulation transfer factors greater than that of reference curve B in FIG. 3 and
      being capable of attenuating at least 60 percent of the X radiation received from the front screen when the reference exposure is repeated with both the front and back screens present.

6. A pair of front and back intensifying screens capable of providing a sharp imagewise exposure of a dual coated silver halide radiographic element to light when imagewise exposed to X radiation predominantly of an energy level below 40 keV, the front intensifying screen being comprised of a fluorescent layer comprised of a terbium-activated gadolinium oxysulfide phosphor and a binder in a weight ratio of 10:1 to 25:1
      having modulation transfer factors greater than those of reference curve A in FIG. 3 and
      being capable of attenuating by 40 to 55 percent a reference X radiation exposure produced by a Mo target tube operated at 28 kVp with a three phase power supply, wherein the reference X radiation exposure passes through 0.03 mm of Mo and 4.5 cm of poly(methyl methacrylate) to reach said fluorescent layer mounted 25 cm from a Mo anode of the target tube and attenuation is measured 50 cm beyond the fluorescent layer, and the back intensifying screen
      having modulation transfer factors greater than those of reference curve B in FIG. 3 and
      being capable of attenuating at least 60 percent of the X radiation received from the front screen when the reference exposure is repeated with both the front and back screens present.

7. A pair of front and back intensifying screens capable of providing a sharp imagewise exposure of a dual coated silver halide radiographic element to light when imagewise exposed to X radiation predominantly of an energy level below 40 keV, the front intensifying screen being comprised of a fluorescent layer comprised of a niobium-activated or thulium-activated yttrium or lutetium tantalate phosphor and a binder in a weight ratio of 10:1 to 25:1
      having modulation transfer factors greater than those of reference curve A in FIG. 3 and
      being capable of attenuating by 40 to 55 percent a reference X radiation exposure produced by a Mo target tube operated at 28 kVp with a three phase power supply, wherein the reference X radiation exposure passes through 0.03 mm of Mo and 4.5 cm of poly(methyl methacrylate) to reach said fluorescent layer mounted 25 cm from a Mo anode of the target tube and attenuation is measured 50 cm beyond the fluorescent layer, and the back intensifying screen
      having modulation transfer factors greater than that of reference curve B in FIG. 3 and
      being capable of attenuating at least 60 percent of the X radiation received from the front screen when the reference exposure is repeated with both the front and back screens present.

* * * * *